3,732,310
MERCAPTOPROPYLAMMONIUM DERIVATIVES
Ludwig Konrad Huber, King of Prussia, Pa., assignor to Pennwalt Corporation, Philadelphia, Pa.
No Drawing. Filed July 19, 1971, Ser. No. 168,787
Int. Cl. C07c 149/24
U.S. Cl. 260—583 B     3 Claims

ABSTRACT OF THE DISCLOSURE 3-mercaptopropylammonium derivatives of the formula $(HSCH_2CH_2CH_2NR^1R^2R^3)X$ where $R^1$ is $NH_2$, $R^2$ is lower alkyl, $R^3$ is alkyl having one to 16 carbon atoms, and X is an anion. The compounds are useful as bactericides and fungicides.

---

This invention relates to mercaptopropylammonium derivatives having bactericidal and fungicidal activity. More particularly, this invention concerns salts of the structure $(HSCH_2CH_2CH_2NR^1R^2R^3)X$ where $R^1$ is $NH_2$ or lower alkyl (i.e., alkyl having one to four carbon atoms, for example, methyl, ethyl, propyl, isobutyl), $R^2$ is lower alkyl, $R^3$ is alkyl having one to 16 carbon atoms (preferably lower alkyl), alkyl phenyl or phenyl alkyl wherein the alkyl group has from one to 8 carbon atoms (such as methyl phenyl, isopropyl phenyl, hexyl phenyl, phenyl methyl, phenyl ethyl and phenyl hexyl), or $R^2$ and $R^3$ together with the nitrogen atom to which they are attached represent a 5-, 6- or 7-membered heterocyclic ring (e.g. pyrrolidine, pyridine, pyrolle, pyrolline, oxazolidine, thiozolidine, morpholine, thiomorpholine, piperidine, homopiperidine, homomorpholine, etc.), and X is a monovalent anion such as Cl⁻, Br⁻, I⁻, acetate, formate, lactate, tosylate, and the like, preferably one of the aforesaid halogens.

The novel compounds of this invention are prepared by reacting a 3-halopropanethiol, wherein the halogen is chlorine, bromine or iodine, with a tertiary amine of the formula

or an N,N-disubstituted hydrazine of the formula

where $R^1$ and $R^2$ are lower alkyl and $R^3$ is alkyl, alkyl phenyl or phenyl alkyl, or $R^2$ and $R^3$ together with the nitrogen atom to which they are attached represent a heterocyclic ring, as previously defined. The reaction is carried out at temperatures within the range of about −10° C. to about 150° C., preferably within the range of about 10 to 80° C. The reactants are brought together in essentially stoichiometric amounts. Inert solvents, in particular polar types such as alcohols, cholorform, dimethylformamide, dimethyl acetamide, benzene, etc. can be employed as reaction media, or the reaction can be conducted neat. If a low boiling amine is reacted, a closed system is desirably used to prevent the reactants from escaping. Reaction times vary from several hours to several days, largely depending on the particular amine and 3-halopropanethiol used, and also depending to some extent on the reaction medium and reaction temperature. Purification of the product compounds is effected by standard methods such as precipitation or recrystallization from suitable solvents or solvent combinations. The halo salts thus produced can be converted to the salts of the other monovalent anions, as set forth above, by simply reacting the novel halo salt of the mercaptan with a simple salt, e.g. alkali metal salt, of another monovalent anion, for instance, sodium acetate, potassium formate, etc.

The compounds embodied in this invention are active in inhibiting the growth of and killing bacteria and fungi, including those pathogenic to humans, e.g., *Staphylococcus aureus* and *Escherichia coli*. Other representative bacterium and fungus species against which the compounds may be used are *Aspergillus niger*, *Chaetomium globossum*, *Venturia inaequelis*, *Podosphaera leucotricha*, *Puccinia recondita*, *Trichophyton interdigitale*, *Rhizopus stolonifer* and *Aphanomrces euteiches*.

It has been established that it is the cation portion $(HSCH_2CH_2CH_2NR^1R^2R^3)$ of the salt of this invention from which the bactericidal and fungicidal activity of the compound derives, and, in particular, it is surprising that the propylene group therein ($-CH_2CH_2CH_2-$) has a significant effect on such bactericidal properties. T. Havada, Bull. Chem. Soc. Japan 4, pp. 171–6 (1929) and 6, pp. 258 (1931), prepared the compound $[HSCH_2CH_2N(CH_3)_3]X$ where X is halogen, by reacting a halocholine with thiouracil, i.e.,

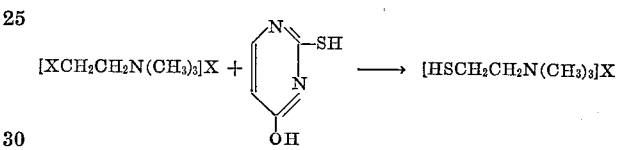

It has been verified that these prior art salts containing an ethylene linkage ($-CH_2CH_2-$) in the cation moiety are relatively ineffective bactericides and fungicides compared to the salts of this invention. Moreover, said prior art compound, where X is chlorine, is an unstable compound which decomposes in a couple of hours rendering it useless as a commercial entity.

The following illustrative examples will clarify the invention and demonstrate its utility.

EXAMPLE I

Into a chilled, heavy-wall glass tube is charged 23.5 g. (0.21 mole) of 3-chloropropanethiol, and 17 g. (0.29 mole) of trimethylamine is condensed inside the tube which is then sealed and allowed to warm to room temperature. The clear colorless solution which forms becomes nearly solid in a few days. No further change is noted after 20 days standing at ambient temperature. After evaporating the volatile products at 60° C., the solid residue is dissolved in about 100 ml. ethanol. Upon stepwise concentration, there are produced several crops (total amount ca. 10 g.) of solids which contain increasing amounts of the desired quaternary ammonium compound besides some trimethylamine hydrochloride formed by side reaction. Treatment of the remaining mother liquor with about 100 ml. of ether yields another crop of the product. Repeated recrystallization from ethanol/ethylacetate converts it to pure trimethyl(3-mercaptopropyl)ammonium chloride of the formula

a white solid, M.P. ca. 182° C.

*Elemental analysis.*—Calcd. for $C_6H_{16}ClNS$ (percent): C, 42.46; H, 9.50; N, 8.24. Found (percent): C, 42.37; H, 9.43; N, 8.67. Reaction of the product with zinc acetate in a methanolic solution yields a white precipitate of the zinc mercaptide.

In standard bacterostatic tests using the "Agar Dilution Method," $[HSCH_2CH_2CH_2N(CH_3)_3]Cl$ gives essentially complete inhibition of *Escherichia coli* at a concentration of 1000 p.p.m., and partial inhibition at concentrations as low as 200 p.p.m. In contrast, the homologous salt

[HSCH$_2$CH$_2$N(CH$_3$)$_2$]I, a commercially available material, does not exhibit any growth inhibition of *Escherichia coli*, even when its concentration is as high as 3000 p.p.m.

EXAMPLE II

To 18.0 g. (0.3 mole) of N,N-dimethylhydrazine is added dropwise at ambient temperature 33 g. (0.3 mole) of 3-chloropropanethiol. A slight exothermic reaction takes place and a yellowish turbid mixture is formed. After stirring at ambient temperature over night, 40 ml. ethanol is added and the reaction mixture heated under reflux for 30 hours. Small amounts of solid are separated by filtration and the mother liquor treated three times with 100 ml. portions of hot ether. The remaining yellow oil is dried under high vacuum, then dissolved in about 40 ml. ethanol and reprecipitated with 200 ml. ethyl acetate. The oily layer is then separated and dried under high vacuum to yield 45 g. of viscous oil. The product thus obtained consists of crude N,N-dimethyl-N(3-mercaptopropyl)hydrazonium chloride,

[HSCH$_2$CH$_2$CH$_2$N(CH$_3$)$_2$NH$_2$]Cl, as confirmed by elemental analysis. Pure product is obtained by repeated fractional precipitation of the oil from ethanol/ethyl acetate.

*Analysis.*—Calcd. for C$_5$H$_{15}$ClN$_2$S (percent): C, 35.19; H, 8.86; N, 16.42. Found (percent): C, 34.99; H, 8.86; N, 15.74.

In bacteriostatic and fungistatic tests using the "Agar Dilution Method," the compound effects complete inhibition of *Staphylococcus aureus* and *Escherichia coli* at concentration of 500 p.p.m., and shows fungistatic activity against *Aspergillus niger* at concentrations as low as 5 p.p.m.

I claim:
1. A mercaptopropylhydrazonium salt represented by the structure (HSCH$_2$CH$_2$CH$_2$NNH$_2$R$^2$R$^3$)X where R$^2$ is lower alkyl, R$^3$ is alkyl having 1 to 16 carbon atoms, and X is a monovalent anion.
2. A compound according to claim 1 wherein R$^2$ and R$^3$ are each lower alkyl.
3. A compound according to claim 1 wherein the anion X is chlorine, bromine or iodine.

No references cited.

LEWIS GOTTS, Primary Examiner

D. R. PHILLIPS, Assistant Examiner

U.S. Cl. X.R.

260—293 R, 567.6 R, 569; 424—325, 329